Aug. 25, 1964 R. C. WILSON 3,145,618

RAMMER MECHANISM FOR A LOADER

Original Filed Oct. 22, 1959 10 Sheets-Sheet 1

INVENTOR
Richard C. Wilson

BY Q. Baxter Warner
Walter G. Finch
ATTORNEY

Aug. 25, 1964 R. C. WILSON 3,145,618

RAMMER MECHANISM FOR A LOADER

Original Filed Oct. 22, 1959 10 Sheets-Sheet 2

Aug. 25, 1964 R. C. WILSON 3,145,618

RAMMER MECHANISM FOR A LOADER

Original Filed Oct. 22, 1959 10 Sheets-Sheet 3

Aug. 25, 1964 R. C. WILSON 3,145,618

RAMMER MECHANISM FOR A LOADER

Original Filed Oct. 22, 1959 10 Sheets-Sheet 4

Aug. 25, 1964 R. C. WILSON 3,145,618

RAMMER MECHANISM FOR A LOADER

Original Filed Oct. 22, 1959 10 Sheets-Sheet 5

Aug. 25, 1964 R. C. WILSON 3,145,618

RAMMER MECHANISM FOR A LOADER

Original Filed Oct. 22, 1959 10 Sheets-Sheet 6

United States Patent Office 3,145,618
Patented Aug. 25, 1964

3,145,618

RAMMER MECHANISM FOR A LOADER

Richard C. Wilson, Champlin, Minn., assignor, by mesne assignments, to the United States of America as represented by the Secretary of the Navy Original application Oct. 22, 1959, Ser. No. 848,163. Divided and this application Nov. 30, 1959, Ser. No. 856,319
7 Claims. (Cl. 89—1.7)

This invention relates generally to conveyor apparatus, and more particularly it pertains to a conveyor pawl retracting device, hereinafter referred to as a rammer mechanism or arrangement.

The patent application is a division of U.S. patent application Serial No. 848,163, entitled "Guided Missile Launching System," filed by Myron J. Bauer et al., on October 22, 1959.

It is the practice in certain types of modern ordnance armament, such as guided missile launching systems, to use conveyors, hereinafter referred to as loaders, for transporting missile weapons formed of missiles and boosters therefor from a ready service mechanism for storage and selection thereof to a launcher for launching at an aerial target.

Standardized support lugs called shoes are provided on the booster of the missile weapon for engagement with the loader and launcher. These shoes are also advantageously used for weapon support and drive from a track guided saddle cart of the loader. A complex movement of engagement pawls in the saddle cart is necessary for it to pick up and latch to the missile weapon.

It is, therefore, an object of this invention to provide a rammer arrangement for actuating pickup and latching pawls of a loader saddle cart for missile weapons.

Still another object of this invention is to provide a rammer arrangement for forcing dis-engagement of a missile weapon with components of a tray of ready service mechanism and into engagements with components of a saddle cart and floating tracks of a loader.

And still another object of this invention is to provide a rammer arrangement which can be used effectively and efficiently for effecting transfer of a missile weapon from a tray of a ready service mechanism to the trunk of a loader for movement to a launcher for launching of the missile weapon at an aerial target.

A further object of this invention is to provide a rammer arrangement which can be utilized to force a pawl of a saddle to engage the aft booster shoe of a missile weapon and also force the missile weapon forward to engage the loader rail of forward and aft floating track sections of a loader for transfer of the missile weapon to a distant station for further disposal thereof.

In accordance with the invention, a rammer is provided to force a missile-booster combination from disengagement with components of a tray of a ready service mechanism into engagements with components of a saddle cart and forward and aft floating tracks. The rammer is positioned in one of the trunk sections of a loader, aft of the aft floating track at the loader track level.

The rammer functions by buckling and straightening thigh and leg links, respectively, to force a reverse or aft motion pawl of a saddle cart to engage an aft booster shoe of a missile-booster combination. The rammer also forces the missile-booster combination four (4) inches forward for a forward booster shoe to engage the loader rail sections of a forward floating track.

The rammer is made up generally of a rammer piston which is attached to a short chain track section and of a latch valve.

Once the missile-booster combination has been raised in a tray by center hoists of a ready service mechanism of the guided missile launching system, and the aft booster shoe has entered a receptacle of the saddle cart, there remains a horizontal difference of four (4) inches to the loaded position of the saddle cart.

In this present position, the reverse or aft motion pawl is lifted and rests on the top surface of the rear booster shoe. Both a forward motion pawl and the aft motion pawl must be ram-retracted until the latter pawl has passed over the top of the aft booster shoe and dropped to engage the aft surface of the aft booster shoe. The missile booster combination is then rammed by the rammer the four (4) inches forward to disengage the shoe receptacle of the tray, and to engage the saddle cart.

The aft floating track is also positioned in the same trunk section of the loader that the rammer is positioned in. In a stowed and load position, the aft floating track is mated with the saddle cart which floats with it while engaging the aft booster shoe of a missile-booster combination.

Other objects and advantages of this invention will become more readily apparent and understood from the accompanying specification and drawings in which.

Figure 1:
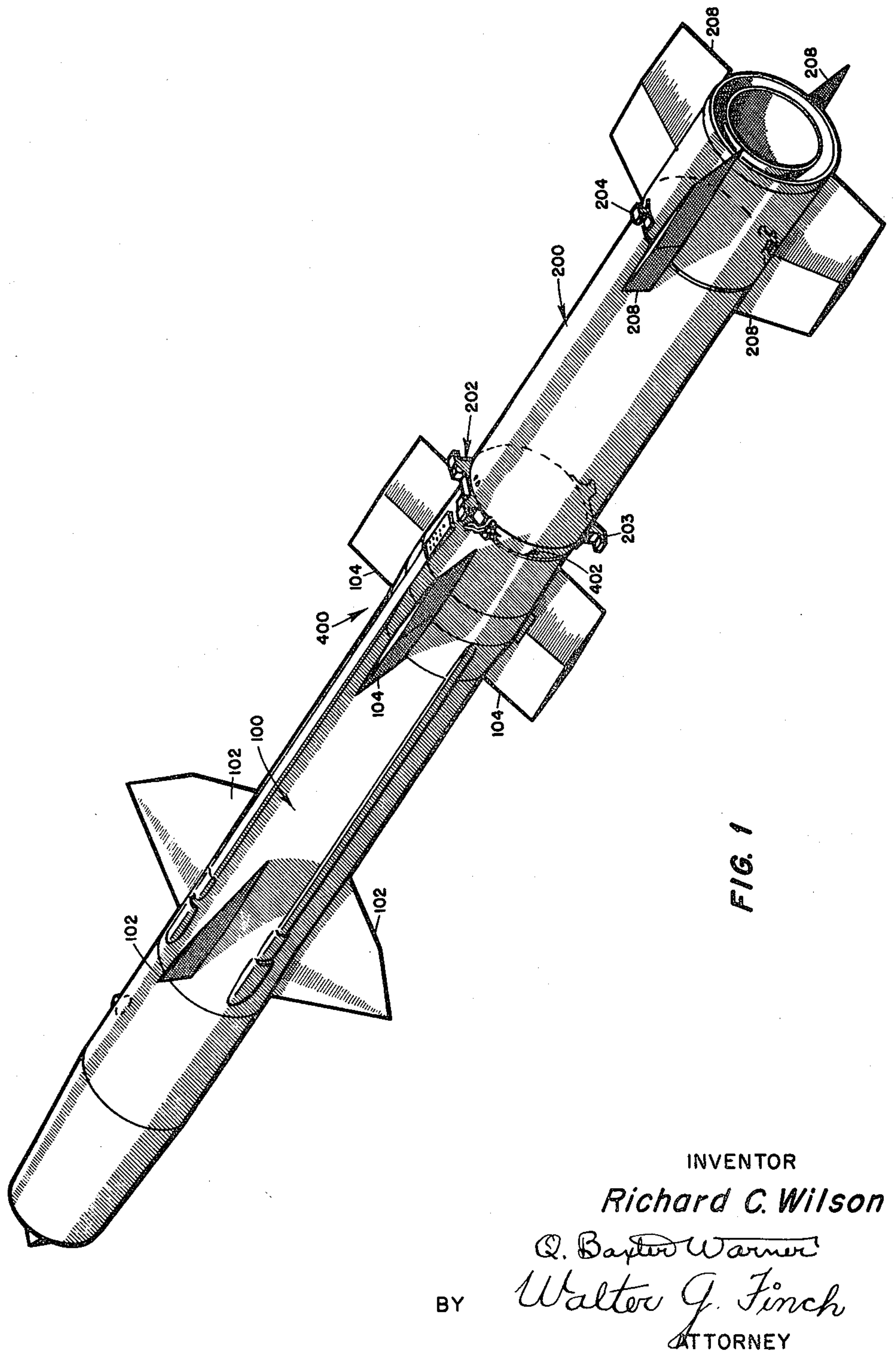
FIG. 1 is a perspective view of a weapon including a missile and booster.

Referring now to FIG. 1 of the drawings, there is illustrated therein a guided missile weapon 400 consisting of a missile 100 and a booster 200 held together by a clamping ring 402. The missile 100 is provided with four wings 102 and tail fins 104, while the booster 200 has four tail fins 208. The booster 200 is provided with a forward upper booster shoe 202 and an aft upper booster shoe 204 by which supporting means may be attached. The booster 200 also has a lower forward booster shoe 203 and a rear or aft booster shoe 205.

Figure 2:
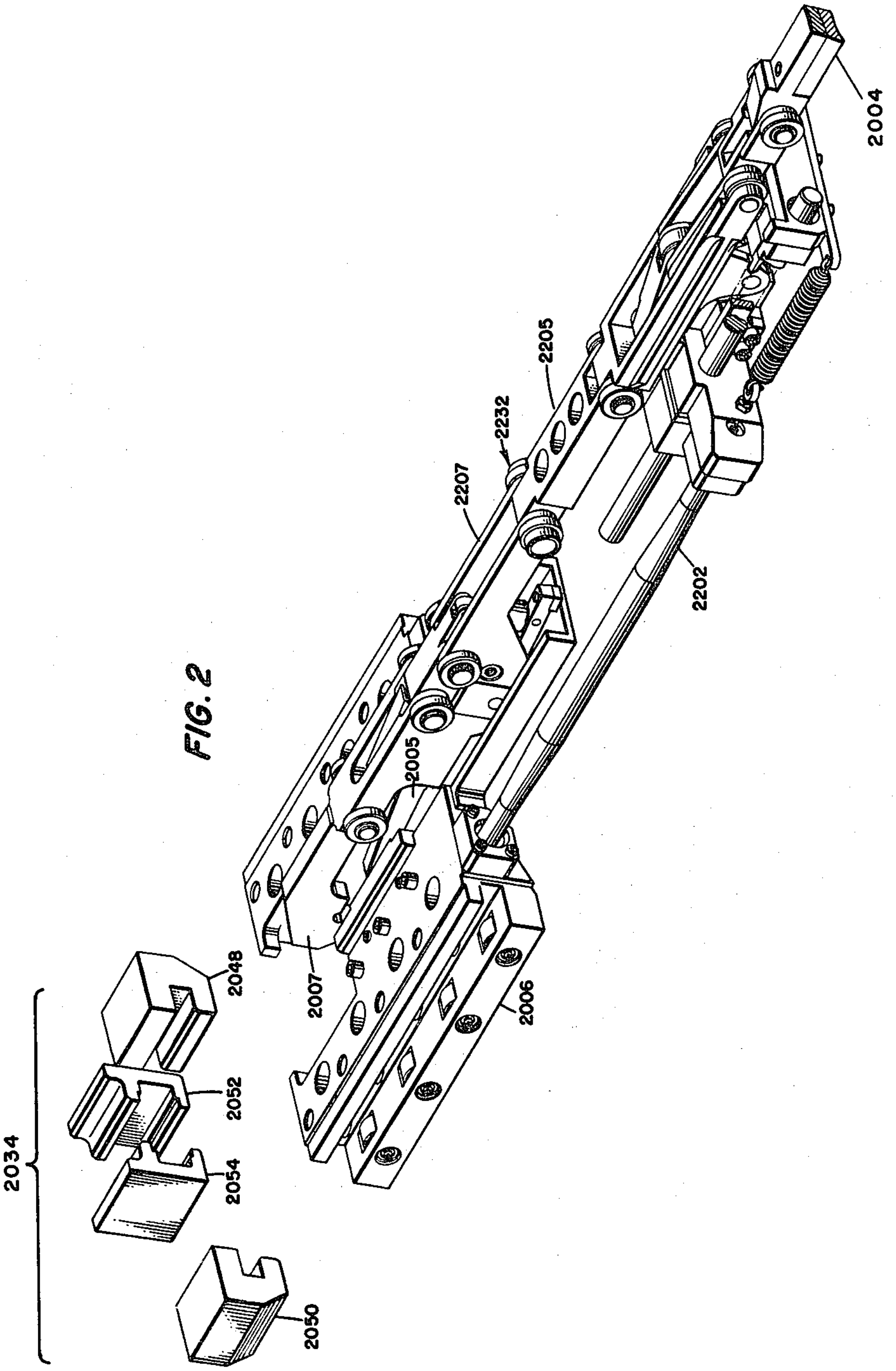
FIG. 2 is a dimetric view of a saddle cart and a pawl linkage arrangement showing their relationship to loader chain tracks and skid tracks.
Figure 3:
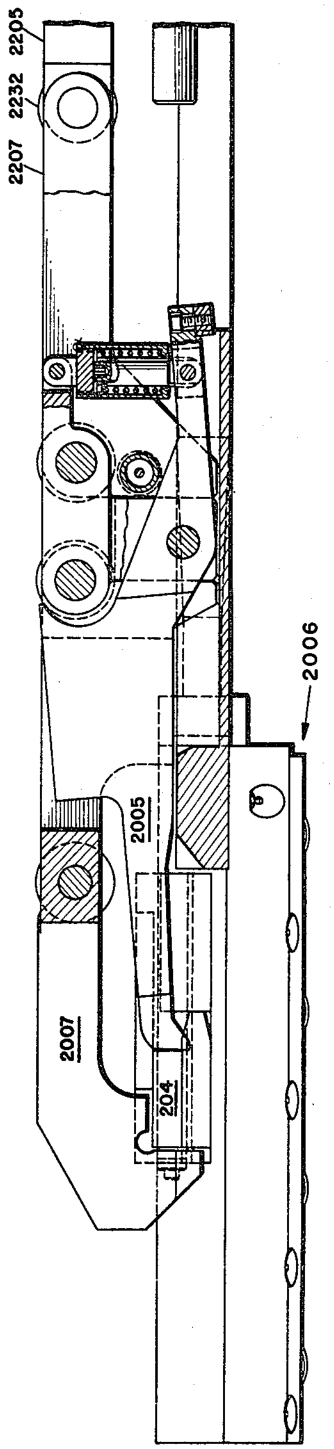
FIG. 3 is a vertical sectional view of the saddle cart, chain pawls, and linkage arrangement.
Figure 3A:
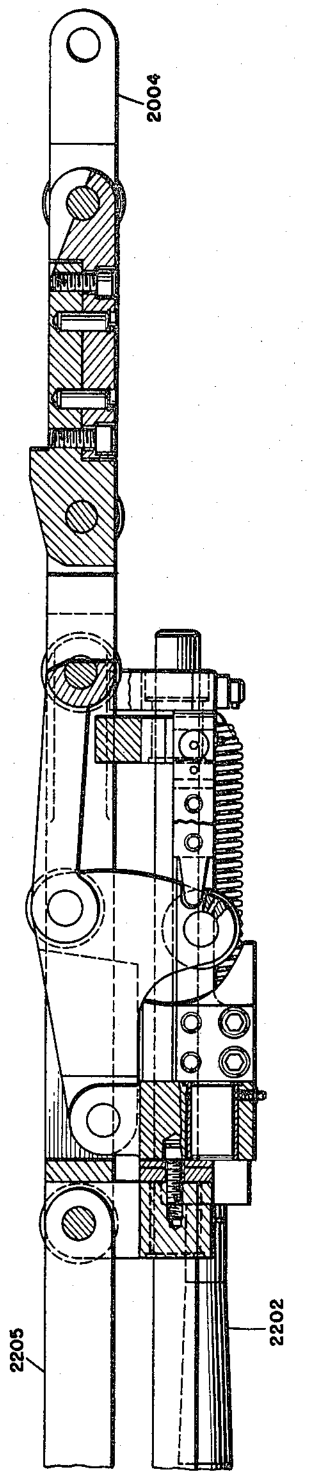
FIG. 3A is a continuation to the right of FIG. 3.

The forward upper booster shoe 202 operates in the nature of a skid on tracks while the aft booster shoe 204 orients the missile weapon 400 parallel to the direction of travel and receives a conveying thrust as it is conveyed in a saddle cart 2006 on the same skid tracks, as shown in FIGS. 2, 3, and 3A.

In FIG. 2, there is shown generally the saddle cart 2006 which is used to engage with and transport the guided missile weapon 400, along a loader track 2034 having a pair of skid tracks 2048 and 2050. The saddle cart 2006 is provided with a pair of missile shoe engaging pawls, that is, a forward motion pawl 2007 and a reverse motion pawl 2005, as shown best in detail in FIG. 3. The booster aft upper booster shoe 204 is receivable between these pawls 2005 and 2007.

Figure 4:
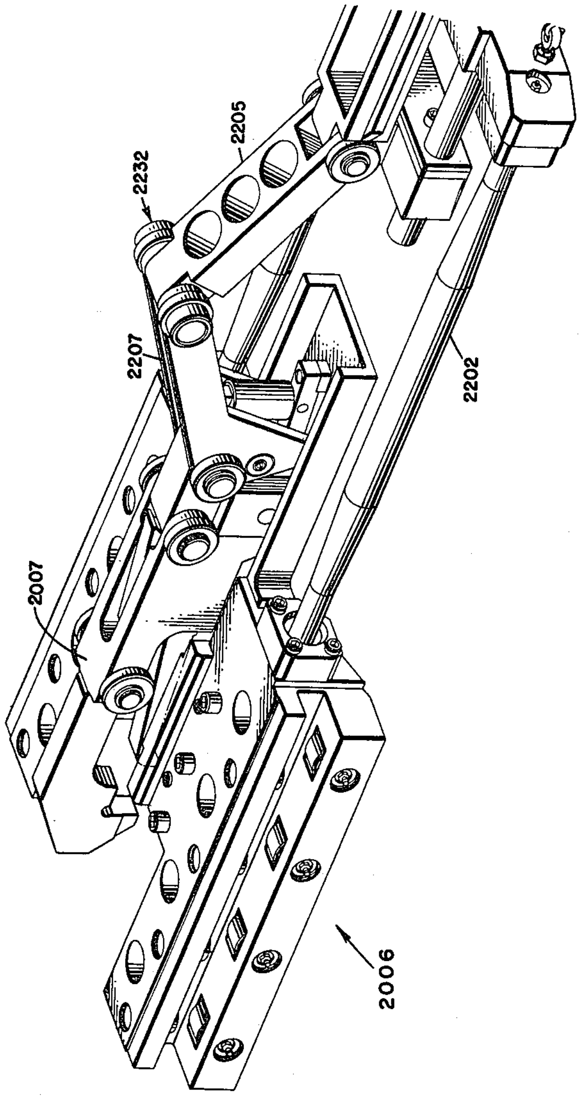
FIG. 4 is a dimetric view of the saddle cart and loader chain linkage arrangement illustrating the buckling action thereof.

In the initial engagement of the aft upper booster shoe 204 and the pawls, the pawls 2005 and 2007 must first be pulled a short distance to the right, with the shoe 204 being captured therebetween and then the pawls returned to the left. This action is accomplished by a hydraulically operated buckling arrangement of articulated links consisting of a thigh link 2205 and a leg link 2207 hinged at a knee joint 2232. The desired movement in this buckling action can be best understood by comparing FIGS. 2 and 4.

Figure 5:
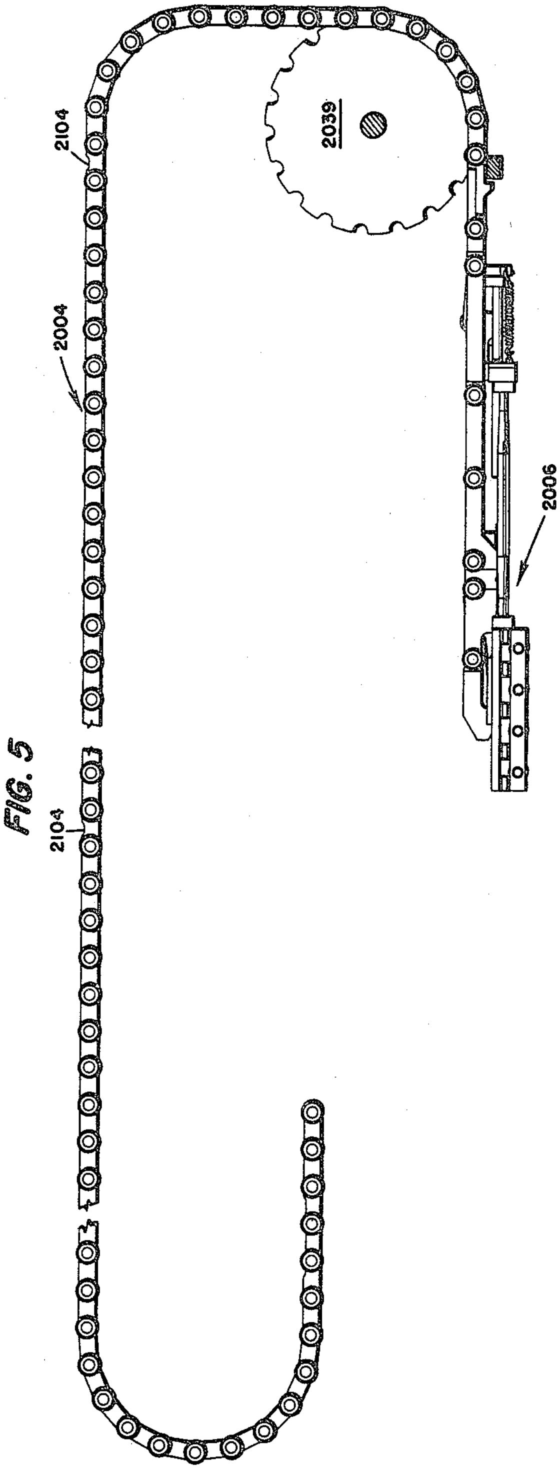
FIG. 5 is a side elevation of the loader chain and saddle cart therefor.
Figure 6:
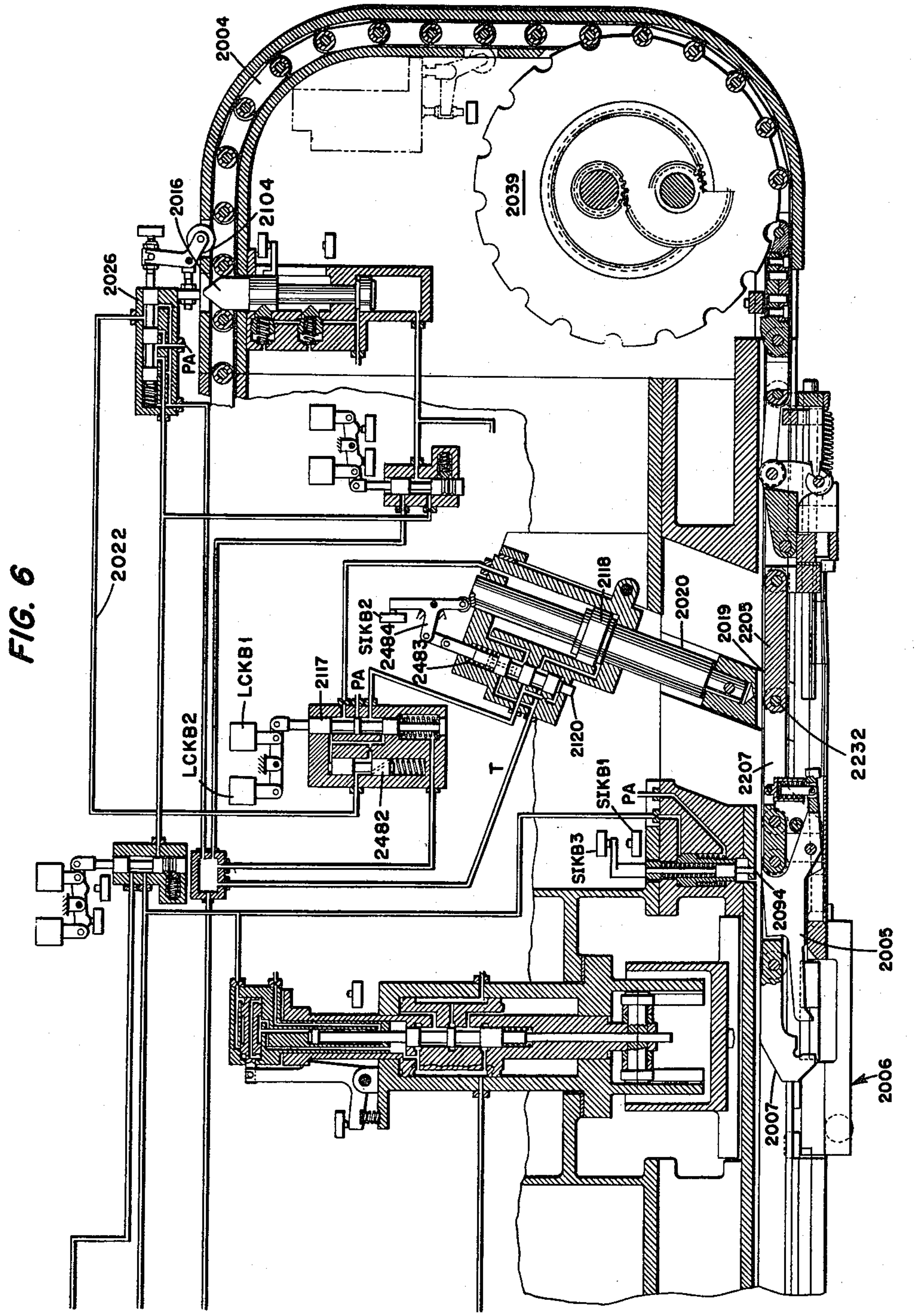
FIG. 6 is a vertical section of the chain drive showing the relationship of the positioner and rammer and their hydraulic components.

As shown in FIG. 5, the saddle cart 2006 is propelled by means of a roller-link type loader chain 2004 which pushes or pulls it as driven by a sprocket 2039. A pointed positioner 2016, shown in FIG. 6 is provided to engage the chain 2004 whenever a positive accurate stop at a loading position is desired. The chain 2004 and the pawls 2005 and 2007 are prevented from buckling under pushing force of the sprocket 2039 by an enclosing guide consisting of a pair of loader chain tracks 2052 and 2054, which are a part of the loader track 2034 as shown in FIG. 2.

At the desired missile weapon engaging station in the travel of the saddle cart 2006, the chain 2004 is brought to a positive stop by the positioner 2016. At the thus-located position of the knee joint 2232 of the saddle cart 2006, a movable short chain track section 2019 is provided, as shown in FIG. 6. This chain track section 2019 is of the same configuration as the loader chain tracks 2052 and 2054, and, in fact, forms a guide path in continuation thereof.

Figure 10:
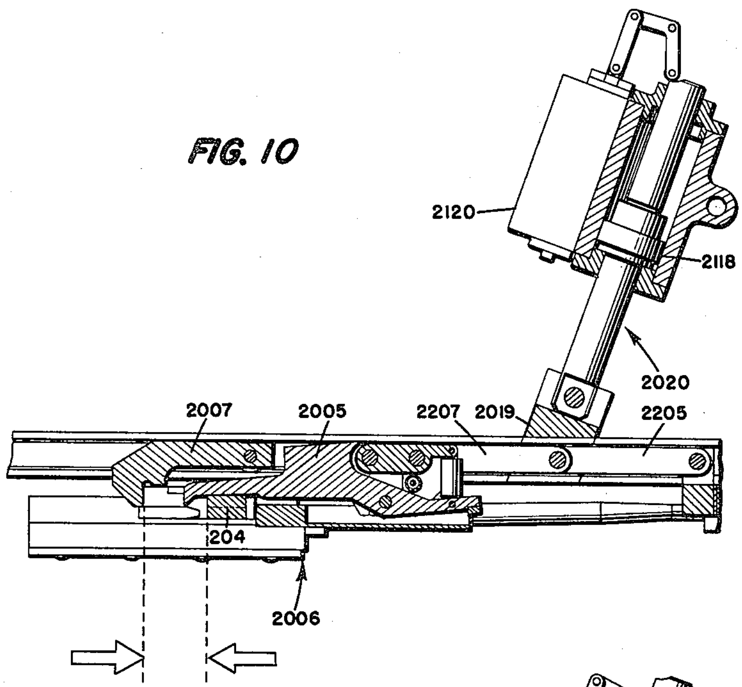
FIG. 10 is a side elevation partly in cross-section, showing the operation of the rammer, with a missile-booster combination hoisted to engage the saddle cart.
Figure 11:
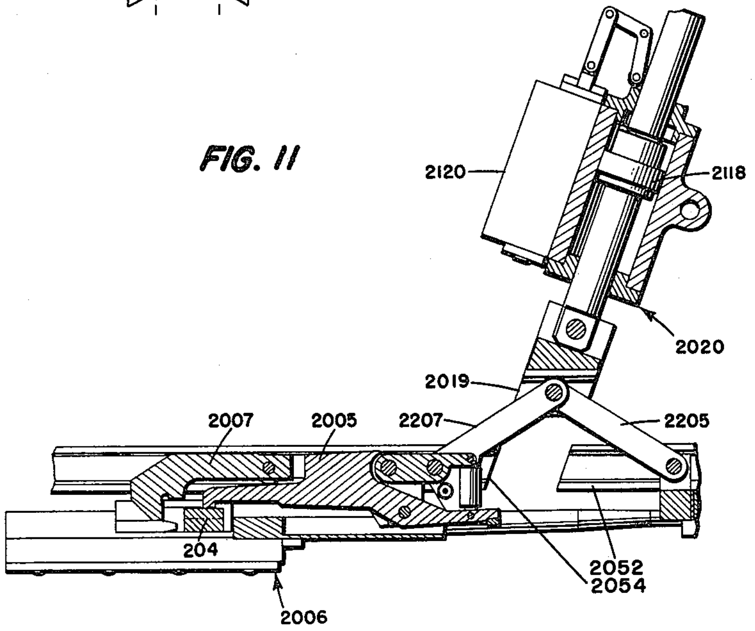
FIG. 11 is a side elevation, partly in cross-section, showing the operation of the rammer, with the pawls partially retracted.
Figure 12:
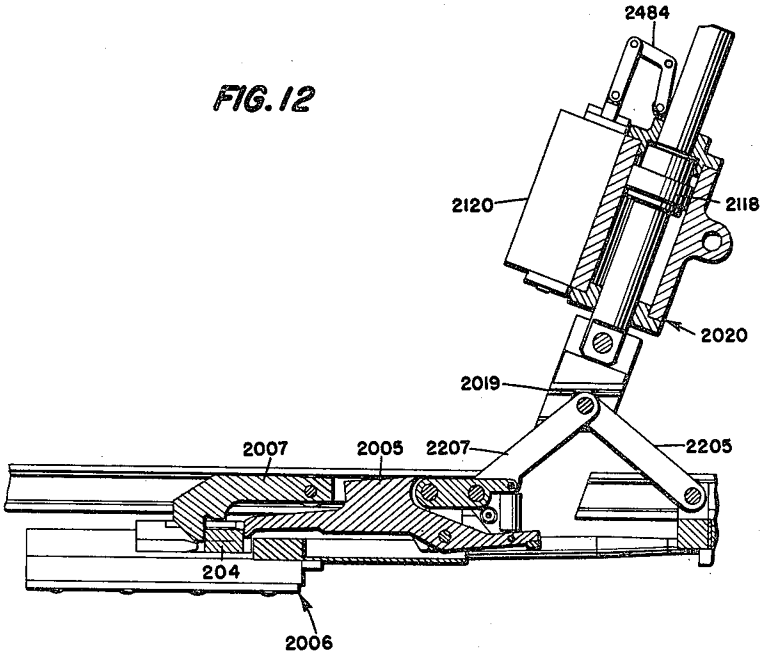
FIG. 12 is a side elevation, partly in cross-section, showing the operation of the rammer, with a pawl dropped behind the aft shoe of the booster.
Figure 13:
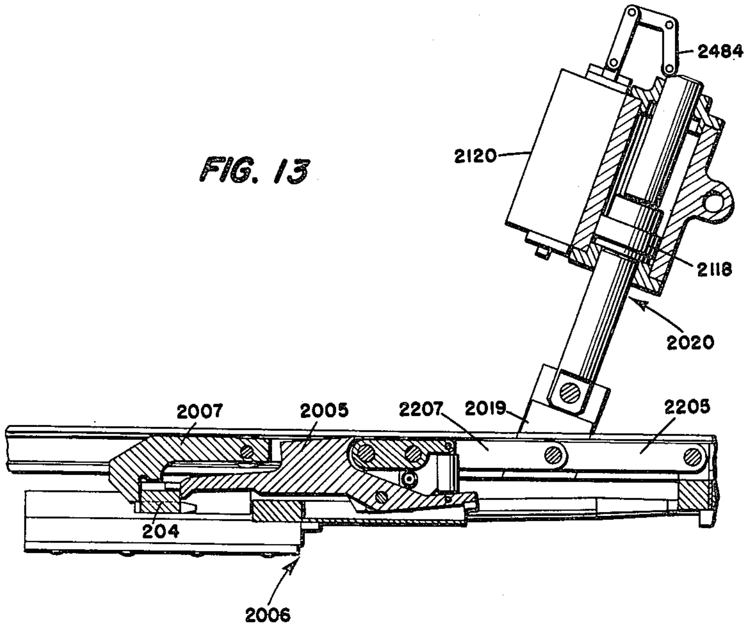
FIG. 13 is a side elevation, partly in cross-section, showing the operation of the rammer, with the missile-booster rammed forward.

The chain track section 2019 is secured to a rammer piston 2118 of a hydraulically actuated rammer 2020, shown best in FIGS. 6, 7, 10 to 13. Rammer 2020 is provided with a latch valve 2120 linked to a bell-crank shaped latch 2484, shown in FIG. 7. An electric switch SIKB2 is linked to the latch 2484 to indicate its locked or unlocked positions remotely as desired. The rammer 2020 is mounted at an angle from the vertical and the track mating ends of track section 2019 are cut correspondingly so that there will be a rightward motion component in addition to the vertical motion to retain the knee joint 2232 when the section 2019 is lifted, as shown in FIG. 11.

FIG. 10 shows the upper aft booster shoe 204 initially inserted in the saddle cart 2006. There now remains a rightward horizontal difference as shown by the arrows of four (4) inches to its desired final loaded position in the saddle cart 2006. In this present position, the reverse motion pawl 2005 is lifted against spring pressure and rests on the top surface of the aft booster shoe 204.

Both the forward motion pawl 2007 and the rear motion pawl 2005 must be ram-retracted simultaneously rightward by an upward motion of the rammer 2020 until the reverse motion pawl 2005 has passed over the top of the aft booster shoe 204 and dropped to engage its rear surface. The aft booster shoe 204 with the entire weapon 400 is then rammed by a downward motion of the rammer 2020 four (4) inches leftward to release the weapon 400 with its lower booster shoes 203 and 205 from hoisting apparatus (not shown) and seating its aft booster shoe 204 in the saddle cart 2006 as shown by the schematic series of the ramming operation illustrated in FIGS. 10, 11, 12, and 13.

Thereafter, the chain 2004 can pass unobstructed through the short chain track section 2019 to propel the saddle cart and engaged missile weapon 400 onward upon the release of the positioner 2016. Further buckling of the links 2205 and 2207 is prevented by the confining action of the chain guides 2052 and 2054.

Accumulator fluid pressure PA for the rammer piston 2118 is always directed to an associated spring centered solenoid operated control valve 2117, and shown in FIG. 6. When the saddle cart 2006 is away from its loading position or weapon engaging station, an interlock valve 2026, operated by the chain 2004, shifts leftward and ports accumulator pressure fluid from a conventional accumulator to the line or conduit 2022.

Because the solenoid operated control valve 2117 is spring centered, both ends of the rammer latch valve 2120 and both sides of the rammer piston 2118 now register this fluid pressure.

Figure 14:
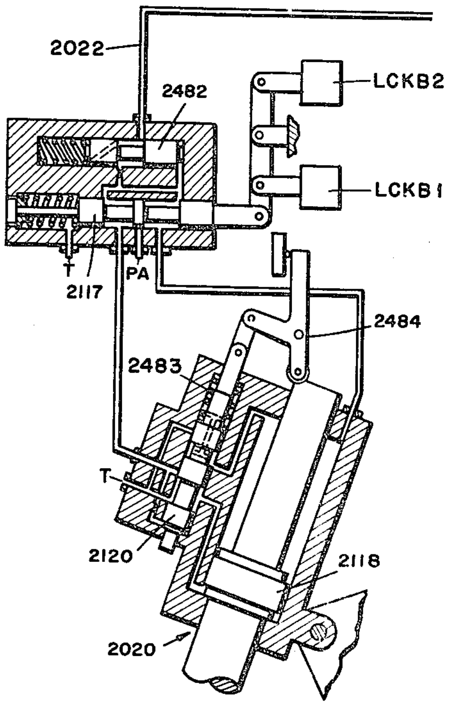
FIG. 14 is a schematic of the hydraulic system.

Since both ends of the rammer latch valve 2120 have the same areas, a compression spring 2483 alone maintains the rammer latch 2484 in the latched position, as shown best in FIG. 14. Each side of the rammer piston 2118 on the other hand, has an unequal area. The top side of the rammer piston 2118 is provided with the larger area so that accumulator pressure fluid in this area exerts a force to keep the rammer piston 2118 safety extended.

When the rammer piston 2118 is to be raised to cause the aft and forward motion chain pawls 2005 and 2007 to engage the aft booster shoe 204, a solenoid LCKB2 is actuated to shift the hydraulic control valve 2117. When the rammer piston 2118 is to be lowered so that the weapon 400 is rammed forward, another solenoid LCKB1 operates the valve 2117 for downward thrust command. The interlock valve 2026 shifts to the position illustrated in FIG. 6 when the position of the saddle cart 2006 is in loading position as evidenced by a cut-out link 2104 in the drive chain 2004 and conduit 2022 then becomes a discharge line to tank.

The valve block of selector valve 2117 also includes a metering valve 2482 for controlling the movement of the rammer piston 2118. As shown in FIG. 6, the rammer metering valve 2482 can regulate the velocity of flow of the fluid, thus maintaining control of the movement of the rammer piston 2118. Discharge hydraulic fluid must flow through the rammer metering valve 2482 before it is ported back to the supply tank through the conduit 2022 and the interlock valve 2026. The rammer metering valve 2482 then allows a maximum flow of fluid which controls the retract-extension rate of the rammer 2020. It exerts no restriction on fluid flow if the flow is below this maximum.

Figures 7, 8, 9:
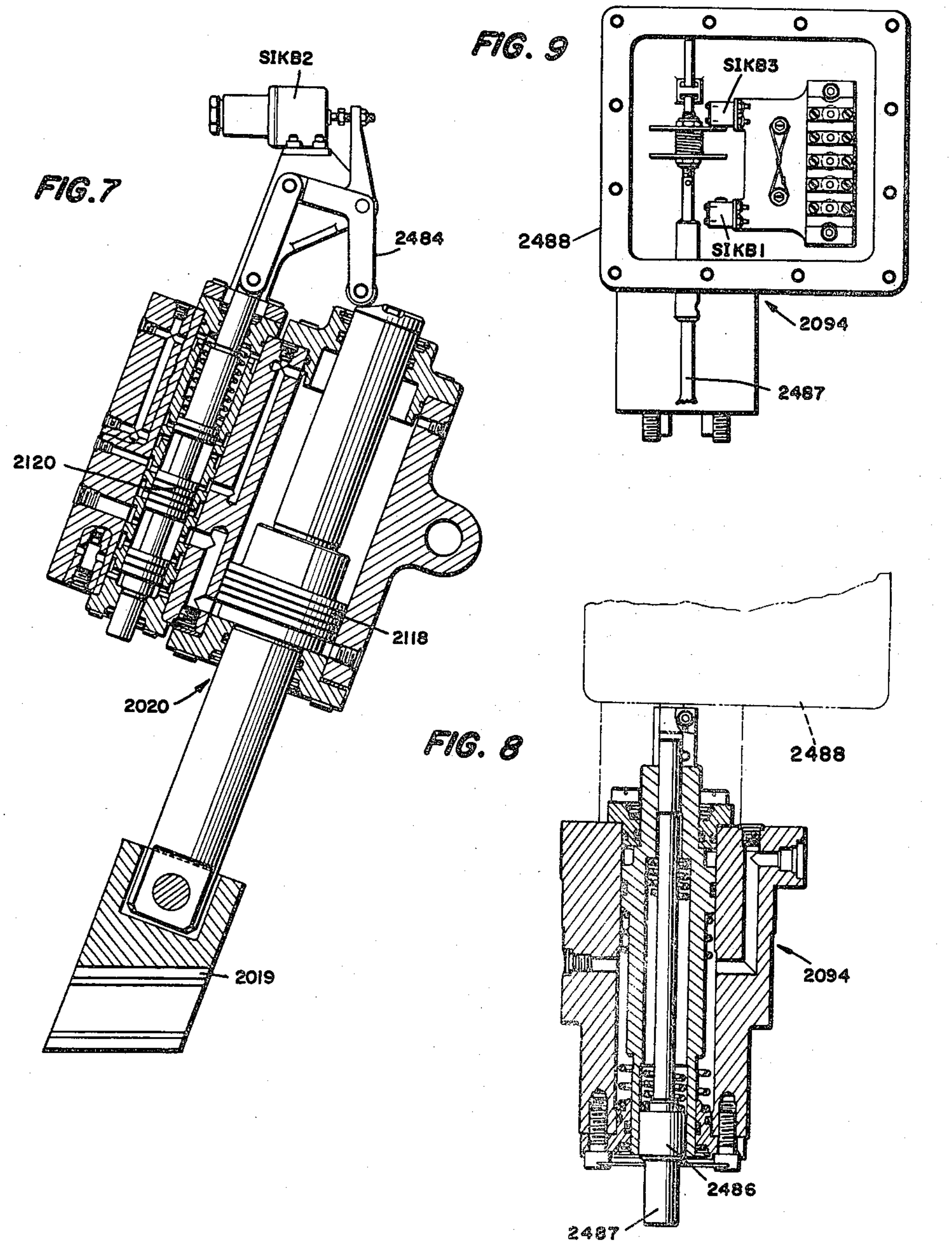
FIG. 7 is a schematic, partly in cross-section and side elevation, of a rammer.
FIG. 8 is a schematic, with parts removed, of the upper portion of a shoe engagement indicator.
FIG. 9 is a schematic, partly in cross section and side elevation, of the lower portion of the shoe engagement indicator of FIG. 8.

Rammer latch 2484 and rammer latch release valve 2120 are attached to the rammer 2020, as best shown in FIG. 7. When the rammer 2020 is to be retracted, it is essential that the flow of pressure fluid from the rammer metering valve 2482 be sequenced to the bottom side of the rammer piston 2118. The pressure fluid first lifts the rammer latch valve 2120, which, in turn, unlocks the rammer latch 2484. The rammer control valve 2117 ports accumulator pressure fluid to the bottom side of the rammer piston 2118 after the rammer latch 2484 is released.

A shoe engagement indicator 2094, shown in FIGS. 6 and 8, is interlocked to the operation of the rammer 2020. When the rammer 2020 retracts, the aft and forward motion pawls 2005 and 2007 of the saddle cart 2006 engage the aft booster shoe 204 as previously mentioned. The rammer 2020 will not have retracted completely when the aft motion pawl 2005 of the saddle cart 2006 contacts a plunger 2487 of the shoe engagement indicator 2094. This relays an electrical condition of contact, and the desired position of the aft booster shoe 204 to the solenoid LCKB1 by means of switches SIKB1 and SIKB3 shown in a switch housing 2488 in FIG. 9. Solenoid LCKB1 is permitted to energize to extend the rammer 2020 only after the indicator 2094 senses that the reverse motion pawl 2005 has dropped in place behind the missile shoe 204.

A shoe engagement indicator piston 2486 is provided in the shoe engagement indicator 2094 and it is spring-loaded. The shoe engagement indicator piston 2486 has constant accumulator pressure fluid existing in the larger valve area, and, as a result, it remains in a normal extended position when not in operation. As the aft motion pawl 2005 of the saddle cart 2006 makes contact with the plunger 2487 of shoe engagement indicator 2094, it creates an upward moving pressure against the indicator plunger which then retracts. When the pawl 2005 drops, the plunger 2487 again extends to perform the electrical switching described for completing the ramming operation.

Obviously, many modifications and variations of the present invention are possible in the light of the above disclosure. It is, therefore, to be understood that within the scope of the appended claims the invention may be practiced otherwise than as specifically described.

What is claimed is:

1. A terminated chain driven system for the transfer of a missile having a shoe thereon from a ready service mechanism to a missile launcher, comprising, a chain movable between a first position wherein said missile is received by said chain from said ready service mechanism and a second position wherein said missile is released by said chain onto said launcher, a terminating pawl mounted on one end of said chain for sequentially capturing and releasing said shoe, a pair of intermediate links pivotally connecting said chain to said pawl and having an articulated joint therebetween, and a housing for confining said chain and pair of intermediate links, said housing having a section thereof mounted for transverse movement of the longitudinal axis of said chain so as to move said articulated joint substantially transversely to the longitudinal axis of said chain when said chain is in said first position to move said pawl into position to capture said shoe.

2. A terminated chain driven system for the transfer of a missile having a shoe thereon from a ready service mechanism to a missile launcher, a chain movable between a first position wherein said missile is received by said chain from said ready service mechanism and a second position wherein said missile is released by said chain onto said launcher, a terminating pawl mounted on one end of said chain for capturing and releasing said shoe, a pair of intermediate links pivotally connecting said chain to said pawl and having an articulated joint therebetween, a housing for confining said chain and pair of intermediate links, said housing having a section thereof mounted for transverse movement of the longitudinal axis of said chain so as to move said articulated joint substantially transversely to the longitudinal axis of said chain, and means associated with said movable section of said housing for the displacement thereof so that said articulated joint can be moved to cause said pair of intermediate links to buckle and shorten the effective length of said chain, thus moving said pawl to capture said shoe.

3. In a terminated chain driven system for the transfer of a missile having a shoe thereon from a ready service mechanism to a missile launcher, a chain movable between a first position wherein said missile is received by said chain from said ready service mechanism and a second position wherein said missile is released from said chain onto said launcher, a terminating pawl mounted on one end of said chain for sequentially capturing as well as releasing said shoe, a pair of intermediate links pivotally connecting said chain to said pawl and having an articulated joint therebetween, a housing for confining said chain and links, said housing having a section thereof mounted for transverse movement of the longitudinal axis of said chain so as to move said articulated joint substantially transversely to the longitudinal axis of said chain, means for securing said chain in a fixed position relative to the articulated joint of said links so as to position said articulated joint in said movable section of said housing, and means associated with said movable section of said housing for the displacement thereof so that said articulated joint can be moved to cause said pair of intermediate links to buckle and shorten the effective length of said chain, thus moving said pawl to capture said shoe.

4. In a terminated chain driven system for the transfer of a missile having a shoe thereon from a ready service mechanism to a missile launcher, a chain movable between a first position wherein said missile is received by said chain from said ready service mechanism and a second position wherein said missile is released by said chain onto said launcher, a terminating pawl secured to one end of said chain for sequentially capturing and releasing a shoe and a pair of links pivotally connecting said chain to said pawl and having an articulated joint therebetween, and a pair of tracks for confining said chain and pair of intermediated links, said tracks having at least one section encompassing said chain and mounted for transverse movement of the longitudinal axis of said chain so as to move said articulated joint transversely to the longitudinal axis of said chain.

5. In a terminated chain driven system for the transfer of a missile having a shoe thereon from a ready service mechanism to a missile launcher, a chain movable between a first position wherein said missile is received by said chain from said ready service mechanism and a second position wherein said missile is released by said chain onto said launcher and having a terminating pawl for capturing and releasing said shoe, a pair of links pivotally connecting said chain to said pawl and having an articulated joint therebetween, a pair of tracks for confining said chain and pair of intermediate links, said tracks having at least one section encompassing said chain and mounted for transverse movement of the longitudinal axis of said chain so as to move said articulated joint transversely to the longitudinal axis of said chain, and a mechanism associated with said movable section of said tracks for the displacement thereof so that said articulated joint can be moved to cause said intermediate pair of links to buckle and shorten the effective length of said chain so as to move said pawl to capture said shoe.

6. In a terminated chain driven system for the transfer of a missile having a shoe thereon from a ready service mechanism to a missile launcher, a chain movable between a first position wherein said missile is received by said chain from said ready service mechanism and a second position wherein said missile is released by said chain onto said launcher and having a terminating pawl for capturing and releasing said shoe, a pair of links pivotally connecting said chain to said pawl and having an articulated joint therebetween, a pair of tracks for confining said chain and links, said tracks having at least one section encompassing said chain and mounted for transverse movement of the longitudinal axis of said chain so as to move said articulated joint transversely to the longitudinal axis of said chain, means for securing said chain in and first position and fixed relative to the articulated joint of said pair of intermediate links so as to position said articulated joint in said movable section of said tracks, and a mechanism associated with said movable section of said tracks for the displacement thereof so that said articulated joint can be moved to cause said pair of intermediate links to buckle and shorten the effective length of said chain so as to move said pawl to capture said shoe.

7. In a terminated chain driven system as recited in claim 6, wherein said mechanism includes a hydraulically operated rammer type piston for forcing said pawl to capture said shoe.

References Cited in the file of this patent

UNITED STATES PATENTS 1,942,247 Johnson ---------------- Jan. 2, 1934

FOREIGN PATENTS 10,849 Great Britain ------------------ 1911